(12) United States Patent
Birk et al.

(10) Patent No.: US 7,286,761 B2
(45) Date of Patent: Oct. 23, 2007

(54) METHOD OF FLEXIBLE MULTIPLE BROADCAST SERVICE DELIVERY OVER A WDM PASSIVE OPTICAL NETWORK BASED ON RF BLOCK-CONVERSION OF RF SERVICE BANDS WITHIN WAVELENGTH BANDS

(75) Inventors: Martin Birk, Sherwsbury, NJ (US); Patrick P. Iannone, Red Bank, NJ (US); Kenneth C. Reichmann, Hamilton Square, NJ (US); Nicholas J. Frigo, Red Bank, NJ (US); Cedric F. Lam, Middletown, NJ (US)

(73) Assignee: AT&T Corp., New York, NY (US)

( * ) Notice: Subject to any disclaimer, the term of this patent is extended or adjusted under 35 U.S.C. 154(b) by 1123 days.

(21) Appl. No.: 09/916,648

(22) Filed: Jul. 30, 2001

(65) Prior Publication Data

US 2002/0093710 A1  Jul. 18, 2002

Related U.S. Application Data

(60) Provisional application No. 60/222,873, filed on Aug. 3, 2000.

(51) Int. Cl.
*H04J 14/00* (2006.01)
(52) U.S. Cl. .............................. 398/66; 398/70; 398/71
(58) Field of Classification Search ............ 398/66–68, 398/70–72, 76, 84, 87, 167.5; 725/129
See application file for complete search history.

(56) References Cited

U.S. PATENT DOCUMENTS 5,262,883 A * 11/1993 Pidgeon ..................... 398/71
5,541,757 A * 7/1996 Fuse et al. .................. 398/72
5,550,666 A * 8/1996 Zirngibl ...................... 398/72
5,742,414 A * 4/1998 Frigo et al. ................. 398/66
5,786,782 A * 7/1998 Ostman et al. ............. 341/141

(Continued)

OTHER PUBLICATIONS

Demonstration and Application of a Monolithic Two-PONs-In-One Device, Yuan P. Li, Lucent Technologies, Bell Laboratories ECOC'96, Oslo, pp. 2.123-2.126.

(Continued)

*Primary Examiner*—Dzung Tran

(57) ABSTRACT

A system and method for simultaneous delivery of a plurality of independent blocks of 500 MHz digital broadcast television services, stacking a plurality of RF blocks on a plurality of spectrally sliced WDM optical bands. The method for delivering a plurality of video blocks to a user terminal serviced by a remote node comprises the steps of receiving, by a first WDM, a broadband signal from a broadband signal source, separating, by the first WDM, the broadband signal into a plurality of optical bands, modulating each of the plurality of optical bands with a composite signal representing data in a plurality of independent RF blocks to form a plurality of modulated signals, the forwarding plurality of modulated signals to a second WDM to form a combined broadcast signal, transmitting the combined broadcast signal over feeder fiber to a remote node, selecting a RF block for distribution over a distribution fiber to a conventional satellite set-up box at a user's site and forwarding the selected RF block to the user's site. A novel method and system for reducing spontaneous beat noise is also disclosed.

7 Claims, 7 Drawing Sheets

U.S. PATENT DOCUMENTS

| | | | | |
|---|---|---|---|---|
| 5,850,303 | A | * | 12/1998 | Yamamoto et al. ............ 398/91 |
| 5,880,865 | A | * | 3/1999 | Lu et al. ........................ 398/72 |
| 6,271,947 | B1 | * | 8/2001 | Iannone et al. ................. 398/9 |
| 6,282,005 | B1 | * | 8/2001 | Thompson et al. ......... 398/143 |
| 6,577,422 | B1 | * | 6/2003 | Frigo et al. ................... 398/49 |
| 6,697,574 | B2 | * | 2/2004 | Frigo et al. ................... 398/71 |
| 6,721,506 | B1 | * | 4/2004 | Lam ............................. 398/70 |
| 2003/0056227 | A1 | * | 3/2003 | Farhan et al. ............... 725/129 |
| 2003/0076560 | A1 | * | 4/2003 | Pratt et al. .................. 359/125 |
| 2004/0218924 | A1 | * | 11/2004 | Fathallah .................... 398/77 |

OTHER PUBLICATIONS

Lightwave Systems with Optical Amplifiers, Journal of Lightwave Technology, vol. 7, No. 7, Jul. 1989, pp. 1071-1082, N.A. Olsson.

An NxN Optical Multiplexer Using a Planar Arrangement of Two Star Couplers, IEEE Photonics Technology Letters, vol. 3, No. 9, Sep. 1991, pp. 812-815, 1991, C. Dragone.

Operational Demonstration and Filter Alignment Study of Multiple Broadcast Video Delivery on a WDM Pasive Optical Network, IEEE Photonics Technology Letter, vol. 10, No. 9, Sep. 1998, pp. 1331-1333, K.C. Reichmann et al.

Experimental WDM Upgrade of a PON Using an Arrayed Waveguide Grating, $22^{nd}$ European Conference on Optical Communication '96, Oslo, pp. 3.31-3.34, Hilbk U. et al.

Long-Reach Broadcast Digital Video Using Broad Sources and Dispresion Compensation, ECOC '98, Sep. 20-24, 1998, Madrid, Spain, pp. 371-372, K.C. Reichmann et al.

High-Speed Point-to-Point and Multiple Broadcast Services Delivered over a WDM Passive Optical Network, IEEE Photonics Technology Letters, vol. 10, No. 9, Sep. 1998, pp. 1328-1330, P. P. Iannone et al.

* cited by examiner

METHOD OF FLEXIBLE MULTIPLE BROADCAST SERVICE DELIVERY OVER A WDM PASSIVE OPTICAL NETWORK BASED ON RF BLOCK-CONVERSION OF RF SERVICE BANDS WITHIN WAVELENGTH BANDS

This application claims the benefit under 37 CFR 1.78 of provisional application 60/222,873 filed on Aug. 3, 2000. The full disclosure of the prior application is incorporated herein by reference.

FIELD OF THE INVENTION

The invention relates generally to Wavelength Division Multiplexing (WDM) passive optical networks (PONs) and specifically to the use of such networks for the simultaneous delivery of multiple RF bands, each nominally equivalent to a conventional CATV service, thereby increasing capacity and flexibility of such systems.

BACKGROUND OF THE INVENTION

Telecommunications services generally fall into two major categories: broadcast services, in which all user terminals receive the same information, and switched services, in which each user terminal receives information specific to him/her. Network infrastructures can be similarly classified. An example of a broadband infrastructure is a conventional CATV network, while an example of a switched infrastructure is the public switched telephone network (PSTN). In general, it is more cost effective to deliver broadcast services on broadcast networks and switched services on switched networks.

While the thrust of the present invention is broadcast telecommunication services, and thus, typically one-way service, broadcast telecommunication services can also include two-way services for interactive services e.g., shopping and games and may include audio as well as video. Two-way services may include information, interactive shopping and games and other services. The upstream portion of the telecommunications would be provided in a known manner and not necessarily in the manner described for the present invention. Upstream services could, however, be combined with the downstream broadcast services of the present invention described herein.

Recent work has shown that the optical properties of certain passive devices can be exploited to permit a given infrastructure to emulate properties of both switched and broadcast infrastructures and thus efficiently provide both switched and broadcast service. In particular, the cyclical properties of Waveguide Grating Routers (WGRs) used in conjunction with Wavelength Division Multiplexing (WDM) provide flexible partitioning of both types of networks using the same physical infrastructure. WGRs are also sometimes called Arrayed Waveguide Grating (AWG), Phased Array (Phasar) or Dragone Routers. The WGR acts as the distribution element at the remote node. Any reference, therefore, to a WGR should be deemed to encompass any such device or other known device for performing similar functionality.

Much work has been done recently to demonstrate the possibilities of such a system to deliver large quantities of digital TV carriers. A particularly robust QPSK (quadrature-phase-shift-keying) transmission format permits the use of low quality and potentially inexpensive optical sources with wide optical bandwidths. In particular, it has been shown that the wavelength domain can be used to deliver "blocks" of television programming channels (one RF block per wavelength band) in a similar manner to known analog block converters. These demonstrations have been shown to deliver multiple 500 MHz blocks of QPSK modulated carriers of, for example, television channels from a Satellite service provider, using the location of the optical band as a multiplexing index.

SUMMARY OF THE INVENTION

The WGR permits simultaneous and cost-effective transmission of both broadcast and switched services with tremendous flexibility. Wavelength-specific lasers are used for high-speed point-to-point switched connections, while broadcasting uses broadband sources (Light Emitting Diodes (LEDs) or Amplified Spontaneous Emissions (ASE) sources), which illuminate all output ports of the WGR at once. Optical bandpass filters spanning a free spectral range (FSR) of the wavelength cyclic WGRs define cascadable service bands.

Using the cyclical or periodic properties of the WGR together with optical sources having wide optical spectra, favor broadcast delivery, while "line sources" with narrow spectra favor switched service delivery. The use of a wide optical spectrum floods the output optical channels so that each output port carries a replica, or spectral slice, of the signal on the input port. The linear properties of this passive device make it possible to overlay both types of services simultaneously on the same infrastructure. The ability to segregate such services has been termed "WDM-on-WDM" in recognition that a coarser scale of WDM (on the order of the period, or "free spectral range" of the WGR) can be used to segregate a multiplicity of both broadcast and point-to-point services on an intrinsically "dense WDM" infrastructure traditionally suitable for point-to-point switched services.

The present invention further increases the capacity (and flexibility) of the QPSK systems capable of delivering blocks of programming by frequency-division multiplexing multiple RF blocks onto each wavelength band. The user terminal may access this large video content by using a conventional satellite set-top box with a front end that has an optical filter for selecting the appropriate optical bands and an RF converter to select the appropriate RF carrier blocks.

The present invention, thus, multiplies the capacity of a known system by increasing the number of RF blocks for each wavelength band. The vast number of RF subcarriers, however, may drive the spectrally sliced channels at the receiver into a spontaneous-spontaneous (sp-sp) beat noise limited regime. Our novel method using multiple WGR input ports to expand the effective optical bandwidth of the received signal enables the present invention to higher capacity than would be possible with the more conventional method of using a single WGR input port. Data are presented showing the simultaneous operation of the entire service matrix of wavelength and RF bands containing 1280 video channels.

It is therefore an object of the present invention to increase the capacity and flexibility in the delivery of broadcast and switched services to a user terminal serviced by a remote node.

It is yet another object of the present invention to increase the delivery of blocks of programming by frequency division multiplexing multiple RF blocks onto each wavelength band.

It is a further object of the present invention to contain costs by using a front end coupled to a conventional satellite set-up box. The front end has an optical filter and an RF converter.

It is yet another object of the present invention to reduce the spontaneous-spontaneous beat noise by using multiple WGR input ports.

BRIEF DESCRIPTION OF THE DRAWINGS

The invention is best described with reference to the detailed description and the following figures, where.

DETAILED DESCRIPTION OF THE PREFERRED EMBODIMENTS

Figure 1:
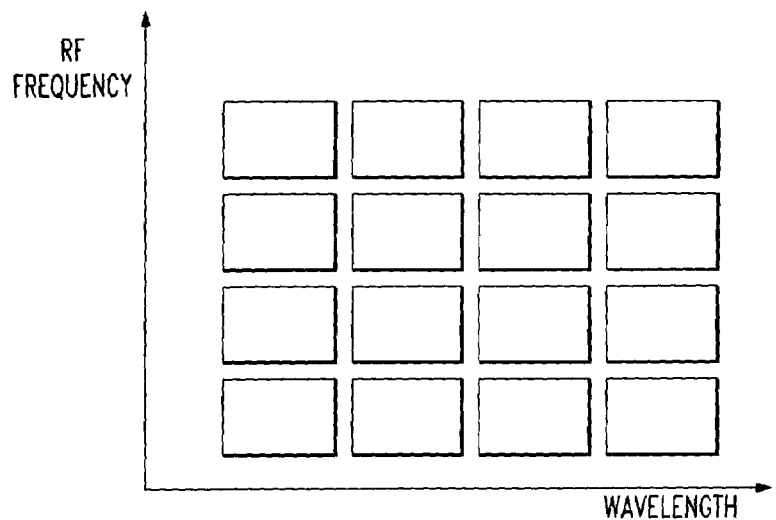
FIG. 1 shows a sample frequency plan for WDM and RF multiplexed services.

FIG. 1 shows a sample frequency plan for WDM and RF multiplexed services. Four wavelengths and four RF blocks per wavelength are used in FIG. 1 for illustrative purposes only. The general concept can be extended in both the RF and wavelength dimensions. Each rectangle in FIG. 1 represents a "block" of service that could be provided to, for example, a user terminal via a conventional set-top box. The services may be video, audio, game, shopping or other services typically provided by entertainment service providers. Shopping services are not limited to services for goods such as clothing and household items but may also include purchases of stocks, bonds, trusts etc. The user terminal, can thus for a modest increase in cost of components (optical filter and RF block conversion) use his/her conventional set-top box to access an order of magnitude more video than would otherwise be available to him/her. The ability to provide such increases in service capacity for low marginal cost is widely believed to be a necessary characteristic for success in the future for telecommunication operators.

Figure 2A:
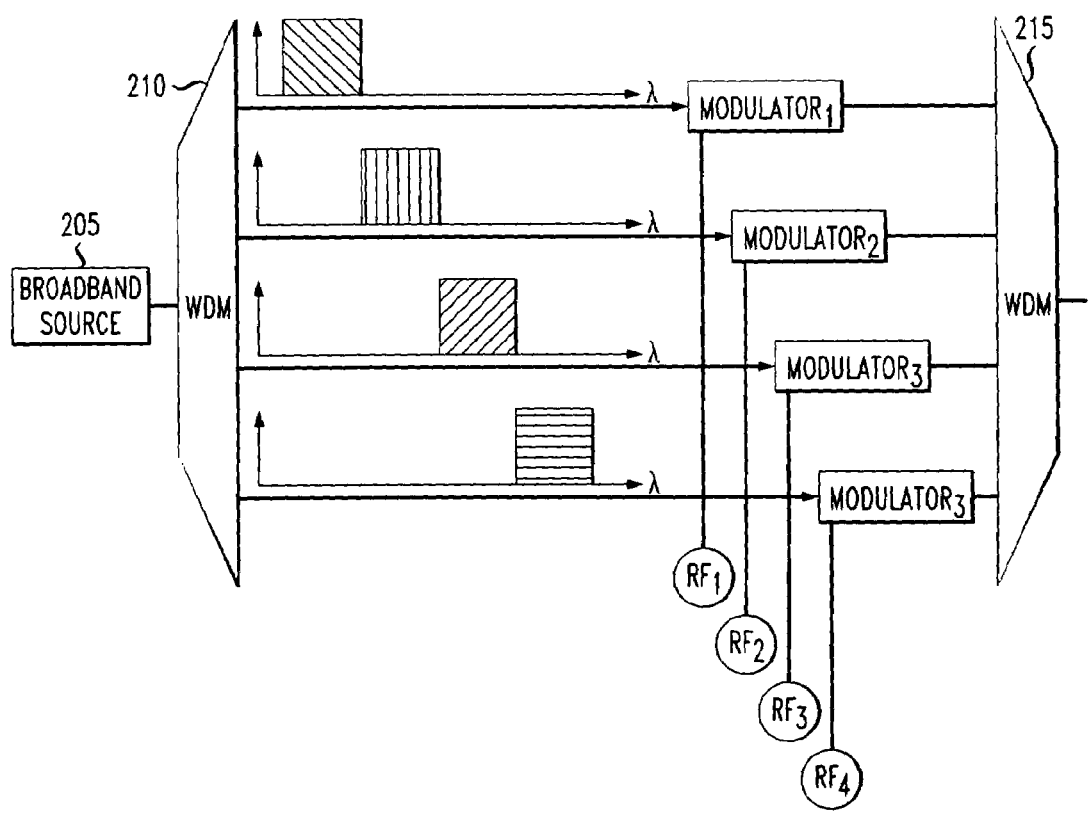
FIG. 2a depicts the system set up for generating the wavelength-frequency plan of FIG. 1.
Figure 2B:
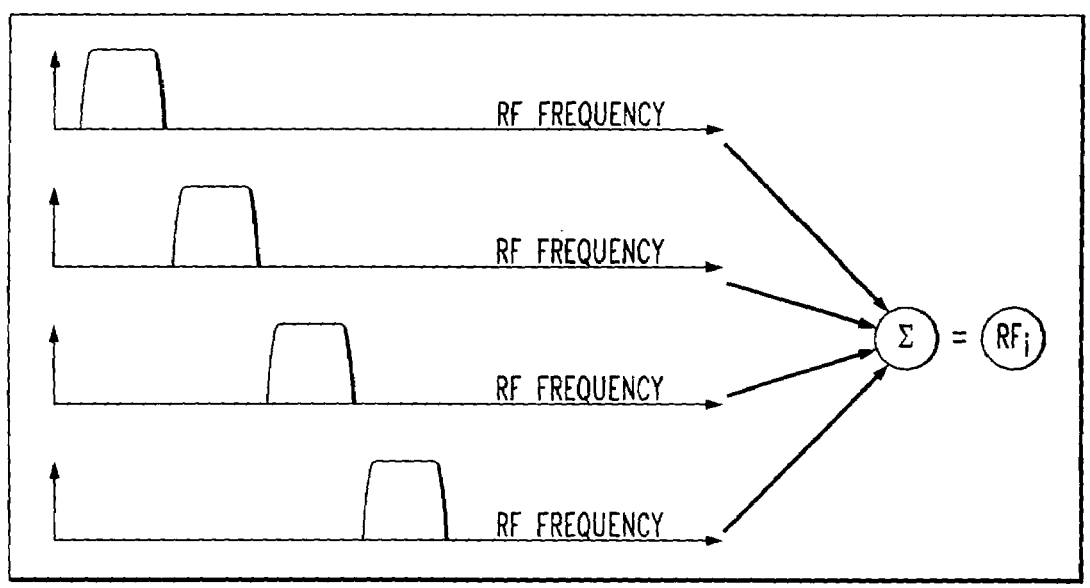
FIG. 2b shows the four independent RF blocks that are summed.

FIG. 2a depicts the system set up for generating the wavelength-frequency plan of FIG. 1. Broadband signal source 205 provides a signal to a first WDM 210. $RF_1$ to $RF_4$ correspond to the stacks of RF carriers modulating different wavelengths. The first WDM 210 (on the left) separates the optical spectrum from the broadband source into four optical bands corresponding to the vertical columns in FIG. 1. Each of the RF bands is then modulated with modulator$_1$ to modulator$_4$ with a composite signal representing the data in four independent RF blocks (shown in FIG. 2b) corresponding to a vertical stack of RF blocks shown in FIG. 1. The combined broadcast signal at the output of the second WDM 215 is distributed to the end user terminals (serviced by a remote node) through a WGR (or equivalent) in the field. It should be appreciated that the broadcast signal is usually optically amplified, split and connected to multiple WGR remote nodes to achieve the maximum cost sharing of the head end equipment.

Figure 2C:
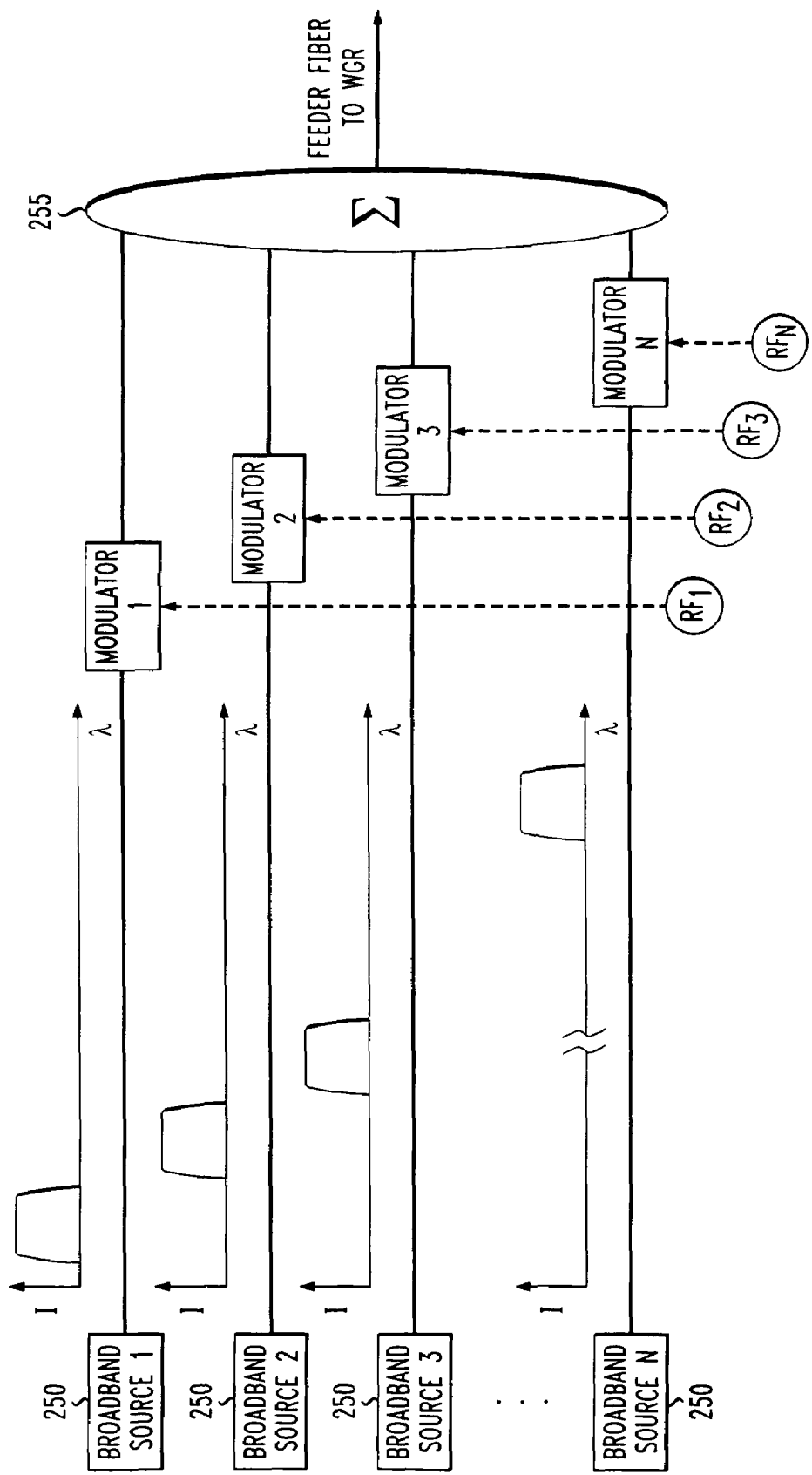
FIG. 2c depicts an alternative embodiment of the present invention.

FIG. 2c depicts an alternative embodiment of the present invention. In particular, FIG. 2c shows an alternative embodiment of the PON transmitter. In this embodiment, the single broadband source 205 and first WDM 210 of FIG. 2a have been replaced with N discrete broadband sources 250. The optical bandwidth of each wavelength band is nominally equal to or greater than the Free Spectral Range (FSR) of the WGR at the remote node. N discrete modulators (Mod 1, Mod 2, . . . , Mod N) impress RF signals onto the corresponding optical bands. The N optical bands are combined via a WDM or passive combiner 255. The combined signal (combined N optical bands) is then propagated along a feeder fiber toward the WGR (not shown). It should be noted that the plurality of N discrete broadband sources may be co-located or located at different sites.

Figure 3A:
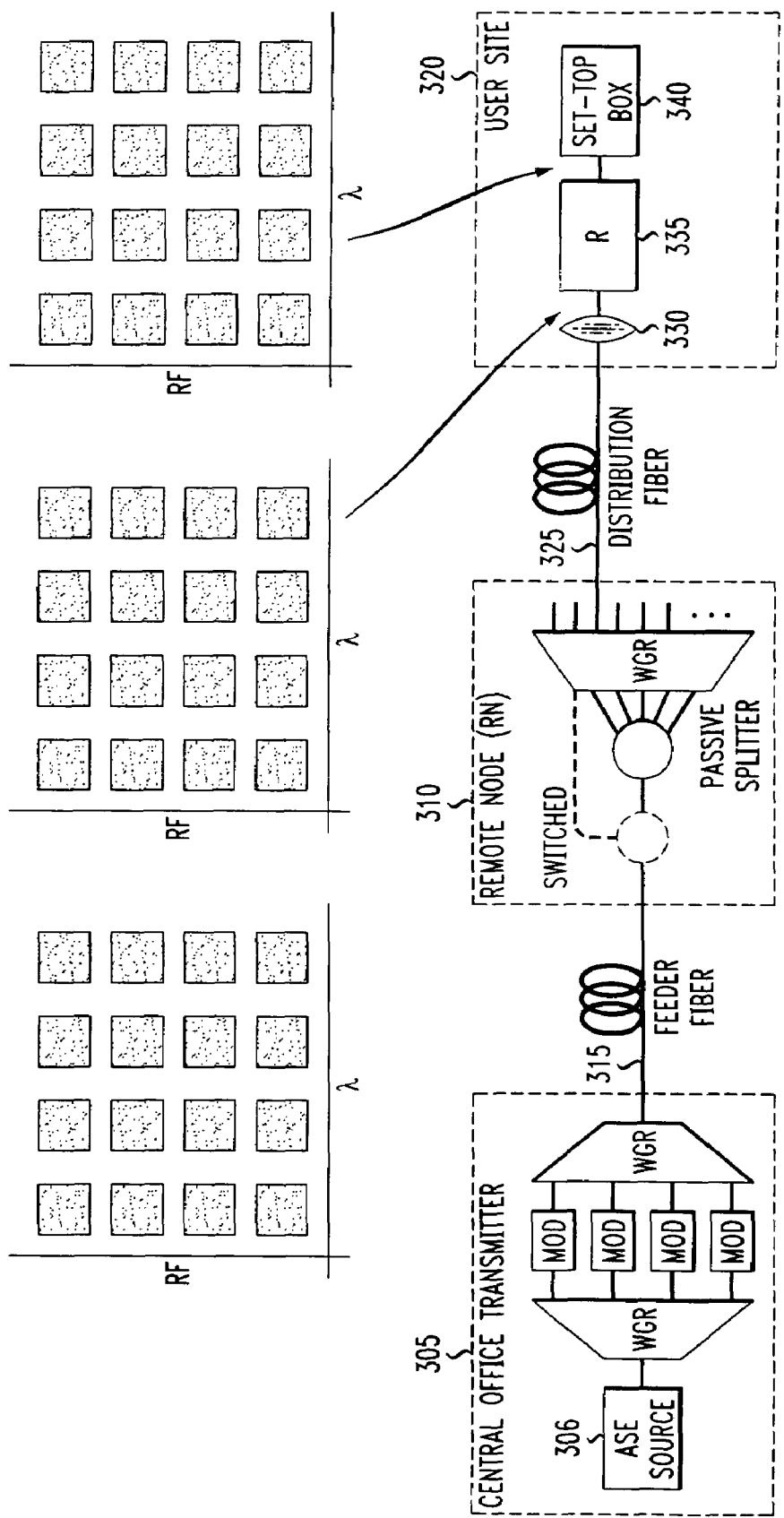
FIG. 3a depicts the system concept of service multiplexing using WDM and RF carrier stacking.

FIG. 3a shows a diagram of the system concept. At central office transmitter 305, the output of a broadband ASE source 306, for example, a gain-flattened Erbium-Doped Fiber Amplifier (EDFA) not shown, is sliced into multiple optical bands whose width matches the FSR of the distribution WGR at a Remote Node (RN) 310 (four bands are shown in the exemplary embodiment). Central office transmitter 305 is coupled to the remote node 310 in the exemplary embodiment via feeder fiber 315. Each spectral band is modulated with multiple blocks of RF subcarriers. In the case of the system demonstration for the present invention, four RF blocks were derived from a commercial satellite antenna. Each RF block of 500 MHz contained greater than 80 digital video channels multiplexed into 16 QPSK carriers in the 950-1450 MHz band. After block-conversion into blocks between 50-550, 550-1050, 1050-1550, and 1550-2050 MHz, these RF bands were combined to externally modulate each of the four optical bands. Consequently, the re-multiplexed optical signal in the feeder fiber contained the entire service matrix shown in the inset to FIG. 3a: each square box represents a 500 MHz block of the commercial service.

In principle, this service suite can be delivered to a WGR at a RN where it can be spectrally sliced and delivered to subscribers, along with switched traffic. Here, the present invention is concerned principally with the broadcast services. The remote node 310 is coupled to a user site 320 in the exemplary embodiment via distribution fiber 325. An optical filter 330 at the user/subscriber site 320, nominally matched to one of the transmitter (optical) WDM bands, selects a "column" (stack of RF blocks). The optical signal is detected with an optical-to-electrical converter 335, such as an Avalanche PhotoDiode (APD) or PIN-FET receiver, the resulting RF stack is block-converted and bandpass filtered to send the desired RF block to the set-top box. The present invention can be considered a new type of set-top box 340. The present invention is identical to a conventional commercially available set-top box, which has been modified to include a front end consisting of an optical bandpass filter and an RF block converter, as well as simple electrical circuitry to keep track of not only the conventional channel number but also the optical band number and RF block number. The present invention effectively multiplies the number of channels that can be accessed with the set-top.

Figure 3B:
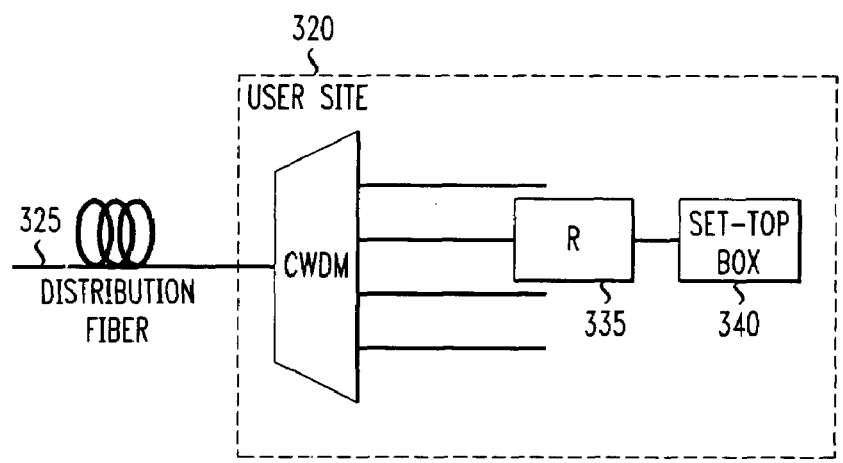
FIG. 3b shows an alternative embodiment of the user site portion of the present invention.

FIG. 3b shows an alternative embodiment of the user site 320 of the present invention. Specifically, a coarse WDM (CWDM) is depicted with multiple inputs. FIG. 3a has a small rectangular box with a single input interposed between the distribution fiber 325 and the small box marked with an "R" which represents an optical to electrical converter. FIG. 3b, on the other hand, depicts a CWDM with a single input and multiple outputs with one of the multiple outputs forwarded to the small box marked with an "R". The CWDM of FIG. 3b functions as a demultiplexer. The CWDM may have multiple inputs as well. The CWDM of FIG. 3b more clearly illustrates the function of selecting one of the optical bands.

Figure 4:
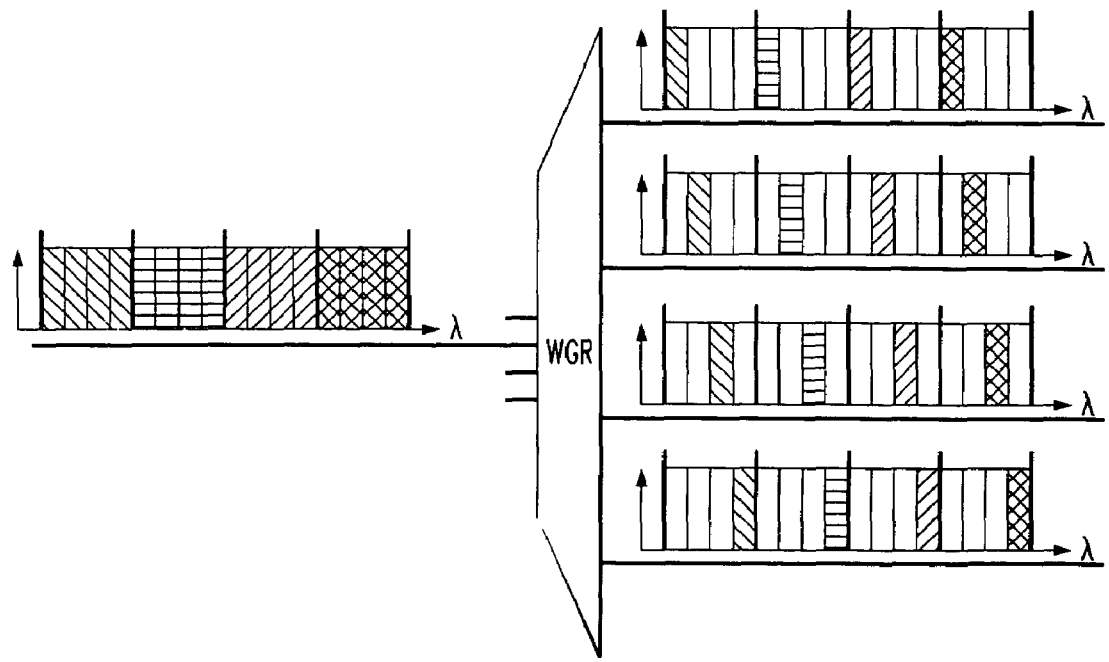
FIG. 4 shows how the cyclic frequency (or periodicity) property of the WGR is used to deliver multiple optically segregated services to each user.

A problem with this scheme is that the spectral slice, the optical portion of the column sent to the detector from its corresponding WGR output port, has a narrow optical width (i.e. the WGR channel width). Adding RF blocks reduces (because of clipping limitations) the modulation depth of each RF carrier, making the system susceptible to spontaneous-spontaneous beat noise $N_{sp-sp}$. The present invention reduces this impairment by passively splitting the broadcast signal and introducing it to the WGR on several input ports. This multiplies the effective optical bandwidth by the number of connected ports and decreases the optical power only by the splitter excess loss, not its splitting ratio. This feature, and the suppression of Mach-Zehnder interferometric noise, accrues by virtue of routing and cyclical properties of the WGR. FIG. 4 shows the broadcast signal distribution to end user terminals through the WGR. The configuration associated with using multiple input ports of the WGR is shown in FIG. 3b. A more conventional implementation would have the feeder fiber directly connected to the input port of the WGR. The present invention includes dashed and solid circles and the associated dashed and multiple solid lines, which are input to the WGR. That is, multiple input ports are used in the present invention. Heavy vertical lines represent the spectral bands defined by the system depicted in FIG. 2a. The smaller rectangles correspond to the WDM channels defined by the WDM, which is located near the subscriber's (user's) home terminal (serviced by a remote node). The WDM is a WGR (or equivalent) and, illustratively, the output fibers run to the individual subscribers' (users') terminals serviced by a remote node. Each small rectangle is a spectral slice, located in one of the service blocks, and each slice carries a replica of the four RF blocks that were modulated in accordance with FIG. 2a. It should be realized that a coarse WDM (shown in the FIG. 3 as the first device in the user's equipment) similar to those depicted in FIG. 2a is required at the user end to re-segregate the multiplicity of different services (either broadcast or switched) into individual spectral bands.

Referring to FIG. 3a, there is shown a central office transmitter 305, a remote node 310 and a user site 320. The signal source is shown as an ASE source 306 but it may be an LED or any other equivalent signal source. Experimental implementation of this system used passive splitters and bulk thin-film filters to emulate the transmitter's WDMs, and used a single 2.5 Gb/s LiNbO$_3$ modulator to simultaneously modulate the entire spectrum after the EDFA noise source. The noise reduction scheme was tested by connecting from one to six of the ports from a 1×8 power splitter to either an 8×8 WGR with 100 GHz spacing or a 16×16 WGR with 50 GHz spacing at the RN 310. (The $N_{sp-sp}$ impairment for a single input port with a 50 GHz WGR made the system impossible to operate.) Since the point of a WDM PON is the ability to upgrade to switched services, the dashed line in the RN shows how those switched services would be split off (selected) with a coarse WDM before being introduced to the WGR. It is noted that this technique is similar in function to the "2 PONs in 1" approach but does not require WDMs on the output lines to re-multiplex the broadcast and switched signals.

Satellite TV broadcast signals from a Direct Satellite Service (DSS) were applied to the system so that the RF blocks represented realistic existing service loads. The receiver input is optically attenuated until the video was corrupted enough to create "blockiness" on the video or a chirp on the audio channel. Thus, the receiver sensitivity for any channel in any RF block in the service matrix could be measured. The delivery of "unstacked" 500 MHz blocks over several different wavelength bands and dispersion compensation techniques for broadband signal delivery in such systems have been demonstrated. Interest in the present invention is to deliver the entire service suite and to test the efficacy of the spontaneous-spontaneous beat noise reduction technique.

Figure 5:
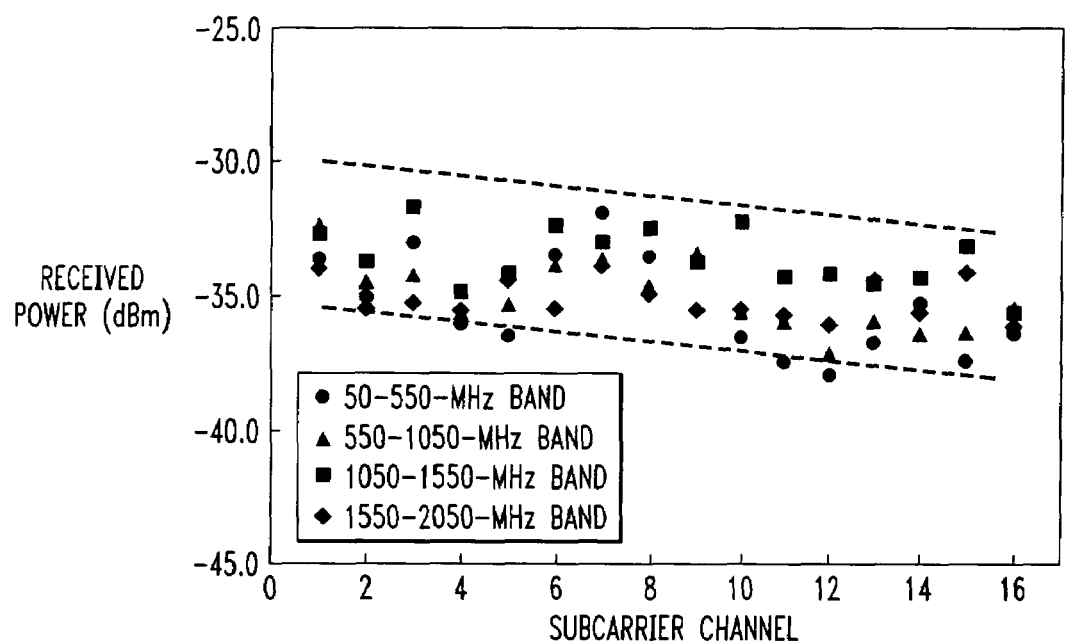
FIG. 5 shows the receiver sensitivity for RF subcarriers in optical band 2.

FIG. 5 shows measured receiver sensitivities for each RF carrier in optical "column 2," a stack of RF blocks. In these experiments, six of the WGR input ports were fed, leaving two for switched services. The results are fairly uniform and decrease along the band, due partly to electronics between the final RF mixer and the set-top box.

Figure 6:
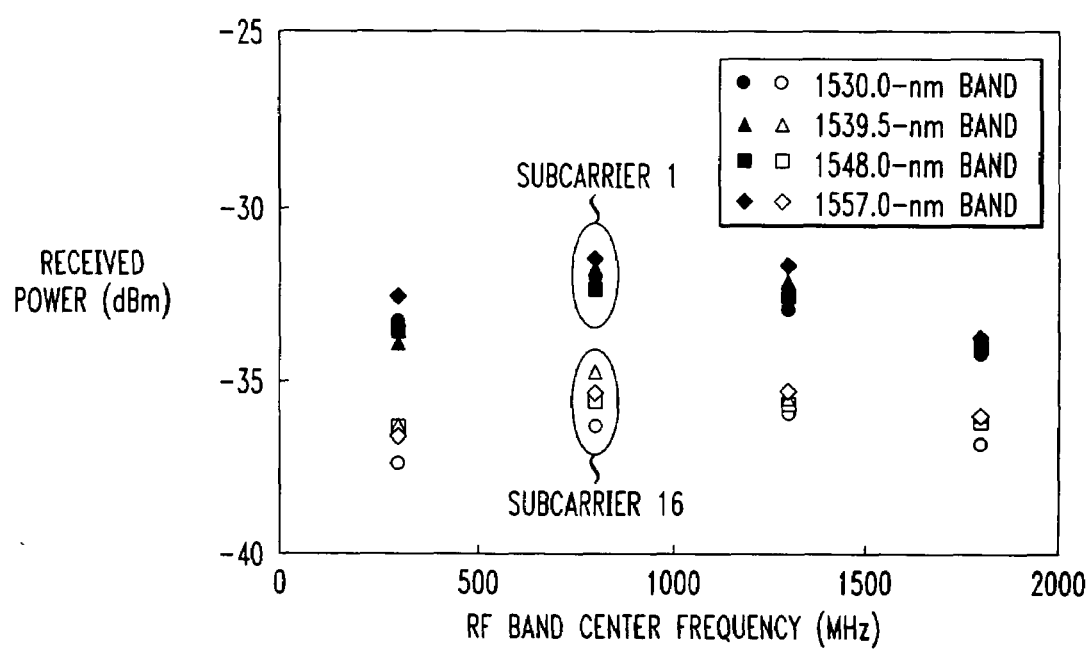
FIG. 6 illustrates receiver sensitivity for subcarriers 1 and 16 in various optical bands and RF blocks.

Whereas FIG. 5 showed the subcarriers for "column 2" only, FIG. 6 shows consistency in going along the "rows" of blocks. That is, the groups of four symbols are fairly tight. These two figures demonstrate that with improved RF engineering, one can expect sensitivities near −35 dBm.

Figure 7:
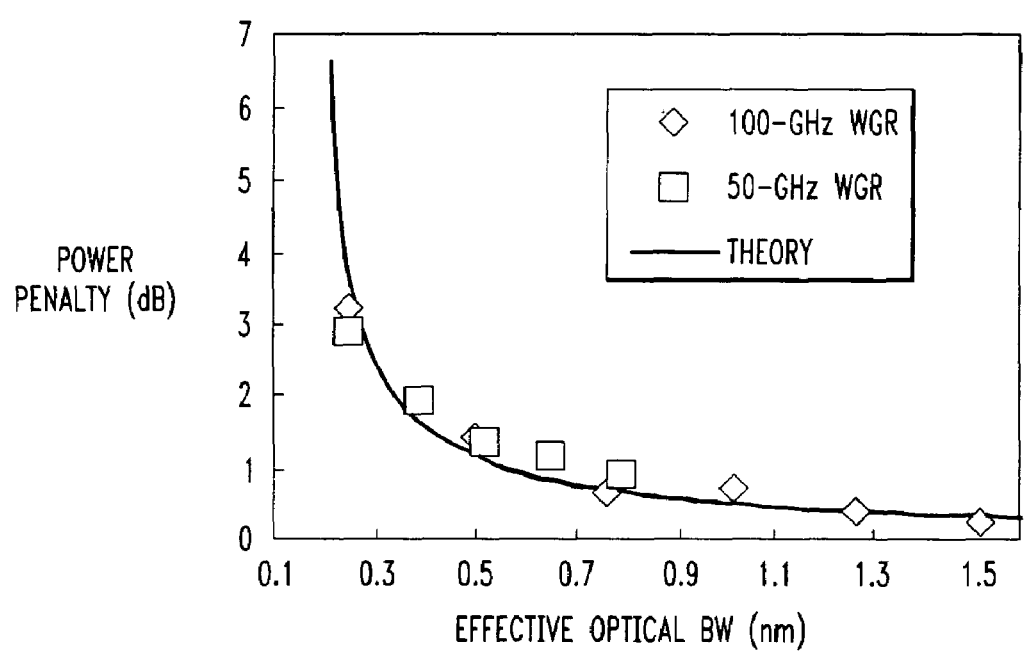
FIG. 7 shows the power penalty due to sp-sp beat noise as a function of the effective optical bandwidth.

Finally, FIG. 7 shows the effect of connecting multiple splitter outputs to the multiple WGR inputs. The carrier to noise ratio (CNR) for the signals detected at the APD can easily be calculated for the presence of thermal, shot, and sp-sp beat noise components. Considered in isolation, the CNR due to sp-sp beat noise is given by $$CNR_{sp-sp} \approx \frac{m^2 \kappa B_o}{NF_{APD}(1+p)B_e} \quad (1)$$

where m is the modulation index for the QPSK subcarriers, κ is the number of WGR input ports connected to the splitter, $B_o$ is the optical bandwidth of a single WGR channel, $NF_{APD}$ is the noise factor due to the APD avalanche, $0 \leq p \leq 1$ is the degree of polarization (a polarizer for the modulator of the present invention was used so p=1), and $B_e$ is the electrical bandwidth of a subcarrier (30 MHz). Decreasing m (increased number of RF carriers) and $B_o$ (spectral slicing) ultimately make $CNR_{sp-sp}$ approach the minimum system CNR. At this point, equation (1) shows that increasing optical power does not help, but increasing effective optical bandwidth does. After a baseline sensitivity test (with WGR removed to obtain low sp-sp noise) the penalties associated with connecting multiple ports were measured and calculated. Expressed as an equivalent optical bandwidth, the theory is a universal curve. As can be seen, there is excellent agreement between the theory and experiment for both WGRs (1-6 ports for the 100 GHz WGR, and 2-6 ports for the 50 GHz WGR).

The broadcast delivery of 1280 digital video channels on a WDM PON has been described and demonstrated. While any services may be delivered besides video and only one-way services have been described herein. The present invention may be used to deliver two-way or interactive services as well. Four wavelength-division multiplexed ASE bands, each modulated with 64 QPSK subcarriers, were spectrally sliced at the RN's WGR. While these numbers of carriers were demonstrated, a lesser or greater number may be considered without departing from the spirit of the present invention. When only one input port of a 50-GHz WGR was connected, the relatively low optical modulation depth per QPSK subcarrier (required to avoid nonlinear distortion) in conjunction with spontaneous-spontaneous beat noise (caused by the decrease in optical bandwidth due to the filtering associated with the WGR) resulted in an infinite power penalty at the receiver due to spontaneous-spontaneous beat noise. This effect was suppressed with a novel remote node architecture, which increased the effective optical bandwidth.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for delivering a plurality of video blocks to a user terminal serviced by a remote node comprising the steps of:
   receiving, by a first WDM, a broadband signal from a broadband signal source;
   separating, by said first WDM, said broadband signal into a plurality of optical bands;
   modulating each of the plurality of optical bands with a composite signal representing data in a plurality of independent RF blocks to form a plurality of modulated signals;
   forwarding said plurality of modulated signals to a second WDM to form a combined broadcast signal;
   transmitting said combined broadcast signal over feeder fiber to a remote node;
   further transmitting said combined broadcast signal over distribution fiber to a user's site; and
   selecting a RF block for distribution over a distribution fiber to a satellite set-top box at a user's site.

2. The method according to claim 1, wherein said optical bands match a Free Spectral Range (FSR) of a Waveguide Grating Router (WGR) at said remote node.

3. The method according to claim 2, wherein said forwarding step further comprises the step of selecting a stack of RF blocks using an optical filter nominally matched to one of said first WDM's optical bands at said user's site, wherein said stack of RF blocks represents one optical band of said plurality of optical bands.

4. The method according to claim 3, further comprising the steps of
   block-converting said stack of RF blocks; and
   bandpass filtering said block-converted stack of RF blocks to retrieve said selected RF block.

5. The method according to claim 4, wherein said combined broadcast signal is passively split and introduced to said WGR on a plurality of said WGR's input ports.

6. The method according to claim 5, wherein said combined broadcast signal is optically amplified prior to being passively split.

7. The method according to claim 6, wherein said delivery of a plurality of video blocks is augmented to additionally include delivery of switched services by using an additional narrowband signal source to provide a narrowband signal and by using an additional coarse WDM to detect and select said switched services prior to introduction of said passively split combined broadcast signal to said WGR.

* * * * *